United States Patent
Morita et al.

(10) Patent No.: US 7,612,533 B2
(45) Date of Patent: Nov. 3, 2009

(54) CAPACITY ADJUSTMENT APPARATUS AND METHOD OF SECONDARY BATTERY

(75) Inventors: Tsuyoshi Morita, Kanagawa (JP); Atsushi Kawase, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 391 days.

(21) Appl. No.: 11/785,066

(22) Filed: Apr. 13, 2007

(65) Prior Publication Data

US 2007/0247116 A1 Oct. 25, 2007

(30) Foreign Application Priority Data

Apr. 14, 2006 (JP) ............................. 2006-112021

(51) Int. Cl.
*H01M 10/44* (2006.01)
*H01M 10/46* (2006.01)
(52) U.S. Cl. ................................................... 320/132
(58) Field of Classification Search ................. 320/107, 320/110, 116, 118, 119, 132, 149
See application file for complete search history.

(56) References Cited

U.S. PATENT DOCUMENTS 6,124,698 A * 9/2000 Sakakibara ................. 320/110

2003/0001544 A1 * 1/2003 Nakanishi .................... 320/162

FOREIGN PATENT DOCUMENTS

JP 2003-284253 A 10/2003

OTHER PUBLICATIONS

U.S. Appl. No. 11/785,078, filed Apr. 13, 2007, Tsuyoshi Morita et al.

* cited by examiner

*Primary Examiner*—Edward Tso
(74) *Attorney, Agent, or Firm*—Foley & Lardner LLP (57) ABSTRACT

In secondary battery capacity adjustment apparatus and method for an assembled cell unit, the assembled cell unit includes: a plurality of secondary batteries; and a control board on which a capacity adjusting section is mounted, the capacity adjusting section being installed to correspond to each of the secondary batteries and configured to consume an electric power of a corresponding one of the secondary batteries to adjust a residual capacity of the corresponding one of the secondary batteries, the number of the secondary batteries to be capacity adjusted is determined in accordance with a heat radiation quantity of the control board, and the electric power of each of the secondary batteries to be capacity adjusted is caused to have consumed by the corresponding capacity adjusting section, for the determined number of secondary batteries to be capacity adjusted, to adjust a capacity of each of the secondary batteries.

8 Claims, 9 Drawing Sheets

| | | FAN ROTATION SPEED | | |
|---|---|---|---|---|
| | | LOW ROTATION | MIDDLE ROTATION | HIGH ROTATION |
| ROOM TEMPERATURE | HIGH TEMPERATURE | A | B | C |
| | MIDDLE TEMPERATURE | B | C | D |
| | LOW TEMPERATURE | C | D | E |

FIG.5

|  |  | ROOM NOISE STATE | | |
|---|---|---|---|---|
|  |  | SMALL | MIDDLE | LARGE |
| CAPACITY ADJUSTMENT REQUIREMENT NUMBER | SMALL | ROTATION SPEED A | ROTATION SPEED B | ROTATION SPEED C |
|  | MIDDLE | ROTATION SPEED B | ROTATION SPEED C | ROTATION SPEED D |
|  | LARGE | ROTATION SPEED C | ROTATION SPEED D | ROTATION SPEED E |

CAPACITY ADJUSTMENT APPARATUS AND METHOD OF SECONDARY BATTERY

BACKGROUND OF THE INVENTION (1) Background of the Invention

The present invention relates to capacity adjustment apparatus and method of secondary batteries.

(2) Description of Related Art

In assembled cells in which a plurality of cells (secondary batteries) are connected, differences in the capacities (residual capacities, hereinafter, described merely as capacities) of the respective cells occur due to variations in characteristics of the respective cells when charges and discharges are repeated and when the assembled cells are left alone. In a state where the assembled cells are used when such capacity differences as described above occur, some cells in states of overcharges and overdischarges are developed so that a life of a whole of the assembled cells becomes short. Therefore, uniformities of capacities of the respective cells are carried out at predetermined frequencies.

In a lithium ion secondary battery in which a lithium cobalt oxide is used for a positive pole and a carbon is used for a negative pole and in a lithium secondary battery in which a lithium cobalt oxide is used for the positive pole and a lithium metal is used for the negative pole (hereinafter, these lithium ion secondary b battery and lithium secondary battery are, in a general term, also called a lithium series secondary battery), such an organic solvent as ethylene carbonate is used for an electrolyte. Hence, if the lithium series secondary battery overcharges, the organic solvent is decomposed and gasified. A frame of each secondary battery is expanded and the organic solvent which is the electrolyte is gasified. Hence, when the subsequent charge is carried out, a charge capacity is extremely reduced due to a full capacity thereof caused by a deterioration of the secondary battery.

To cope with the above-described problem, in the assembled cells of the lithium series secondary battery, such a method in which the capacity of each cell is uniformed by discharging the cells having larger capacities (residual capacities, namely, the residual electric powers) than the other cells has been adopted. For example, a Japanese Patent Application Publication No. 2003-284253 published on Oct. 3, 2003 discloses a method of calculating the adjustment quantity of each cell from a deviation between open voltage values of the individual cells and 1/x of a voltage value of a minimum voltage value B added to a maximum voltage value A from among the open voltage values (x denotes a constant between (A+B)/A and (A+B)/B). It should be noted that the capacity adjustment of the cell is carried out by discharging a capacity adjustment bypass resistor connected in parallel to each cell by a time duration corresponding to an adjustment capacity.

SUMMARY OF THE INVENTION

However, since a heat generation quantity due to the discharge becomes excessive if the discharge is carried out for a multiple number of capacity adjustment bypass resistors, there is a possibility of exerting an ill effect on such electronic parts as CPU (Central Processing Unit) and so forth mounted on a control board abutting the bypass resistors.

It is an object of the present invention to provide secondary battery capacity adjustment apparatus and method for the assembled cell unit which can execute the residual capacity adjustments of the respective secondary batteries in a time as short as possible without an occurrence of the overheat of the control board by controlling appropriately the heat generation quantity at the time of the residual capacity adjustments.

According to one aspect of the present invention, there is provided a secondary battery capacity adjustment apparatus for an assembled cell unit, the assembled cell unit including: a plurality of secondary batteries; and a control board on which a capacity adjusting section is mounted, the capacity adjusting section being installed to correspond to each of the secondary batteries and configured to consume an electric power of a corresponding one of the secondary batteries to adjust a residual capacity of the corresponding one of the secondary batteries, the secondary battery capacity adjustment apparatus comprising: a determining section configured to determine the number of the secondary batteries to be residual capacity adjusted in accordance with a heat radiation quantity of the control board; and a secondary battery capacity adjusting section configured to have the electric power of each of the secondary batteries to be residual capacity adjusted consumed by the corresponding capacity adjusting section, for the determined number of secondary batteries to be residual capacity adjusted, to adjust a residual capacity of each of the secondary batteries.

According to another aspect of the present invention, there is provided a secondary battery capacity adjustment method for an assembled cell unit, the assembled cell unit including: a plurality of secondary batteries; and a control board on which a capacity adjusting section is mounted, the capacity adjusting section being installed to correspond to each of the secondary batteries and configured to consume an electric power of a corresponding one of the secondary batteries to adjust a residual capacity of the corresponding one of the secondary batteries, the secondary battery capacity adjustment method comprising: determining the number of the secondary batteries to be residual capacity adjusted in accordance with a heat radiation quantity of the control board; and having the electric power of each of the secondary batteries to be residual capacity adjusted consumed by the corresponding capacity adjusting section, for the determined number of secondary batteries to be residual capacity adjusted, to adjust a residual capacity of each of the secondary batteries.

In the present invention, when the residual capacities of the respective secondary batteries constituting the assembled cell unit are adjusted, the number of secondary batteries to simultaneously be residual capacity adjusted is determined in accordance with a heat radiation quantity of the control board on which capacity adjusting sections for the respective secondary batteries are mounted. the capacity adjusting sections being heat generation sources. Thus, an efficient residual capacity adjustment in accordance with a cooling capacity of the control board, namely, in a case where the cooling capacity of the control board is large, the simultaneous residual capacity adjustments for a multiple number of secondary batteries are executed and, in a case where the cooling capacity of the control board is small, the simultaneous residual capacity adjustments for a small number of secondary batteries in accordance with the cooling capacity thereof are executed. Consequently, the residual capacity adjustments can be executed in a short time without an overheat of the control board. This summary of the invention does not necessarily describe all necessary features so that the invention may also be a sub-combination of these described features.

The other objects and features of this invention will become understood from the following description with reference to the accompanying drawings.

DETAILED DESCRIPTION OF THE INVENTION

Reference will hereinafter be made to the drawings in order to facilitate a better understanding of the present invention.

Figure 1:
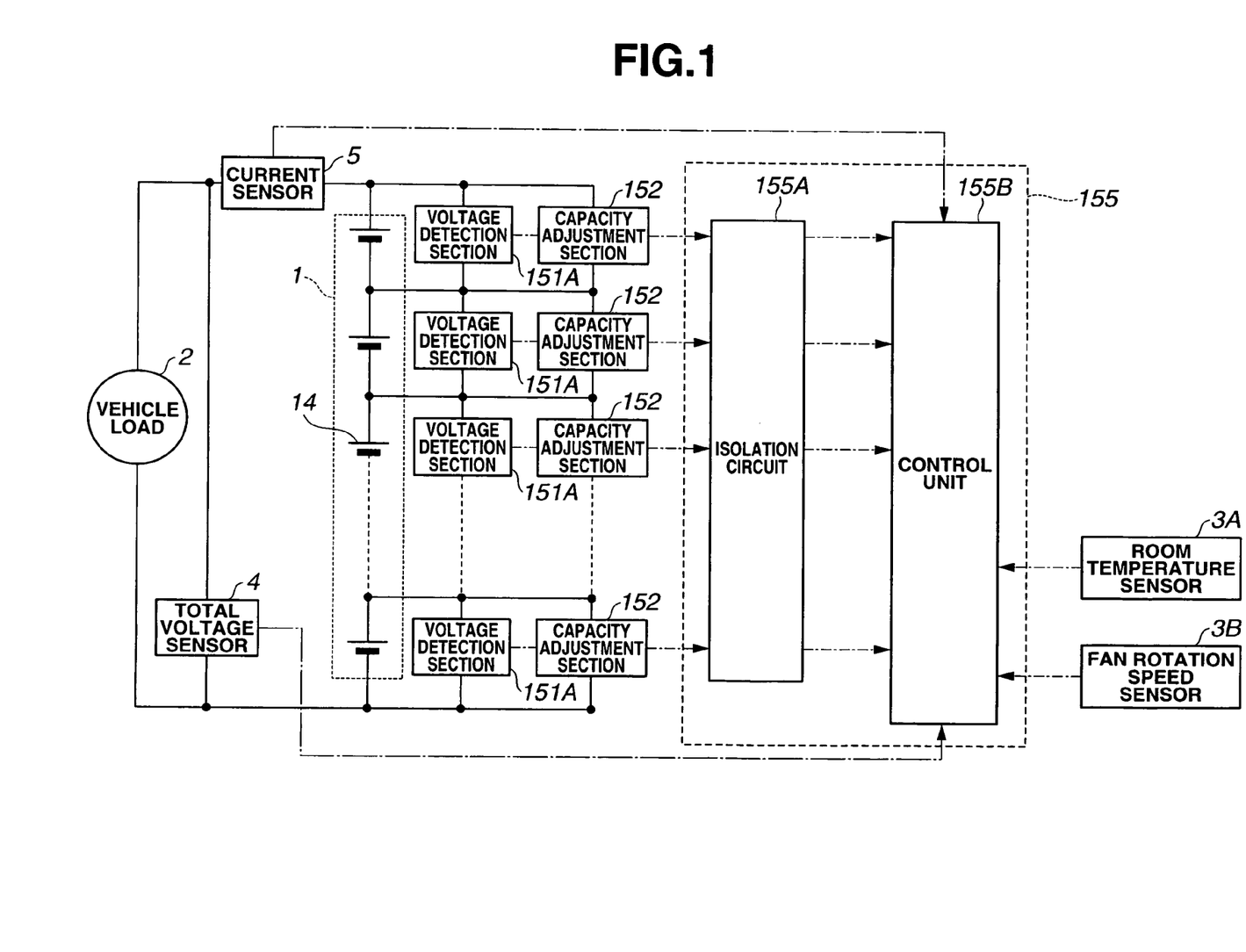
FIG. 1 is a schematic block diagram representing a preferred embodiment of a secondary battery capacity adjustment apparatus according to the present invention.
Figure 2:
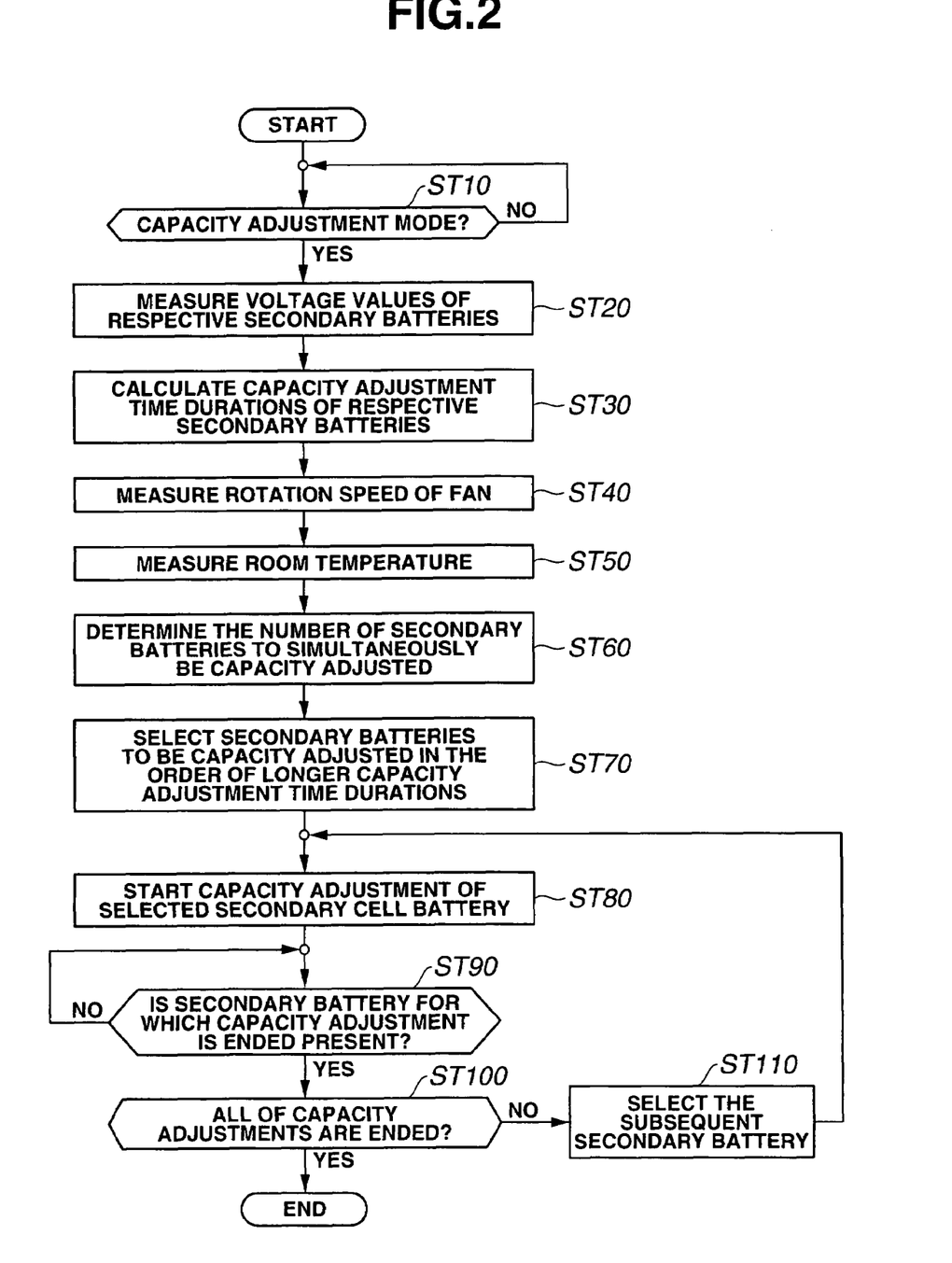
FIG. 2 is a flowchart representing an example of operation of the secondary battery capacity adjustment apparatus in the preferred embodiment shown in FIG. 1.
Figure 3:
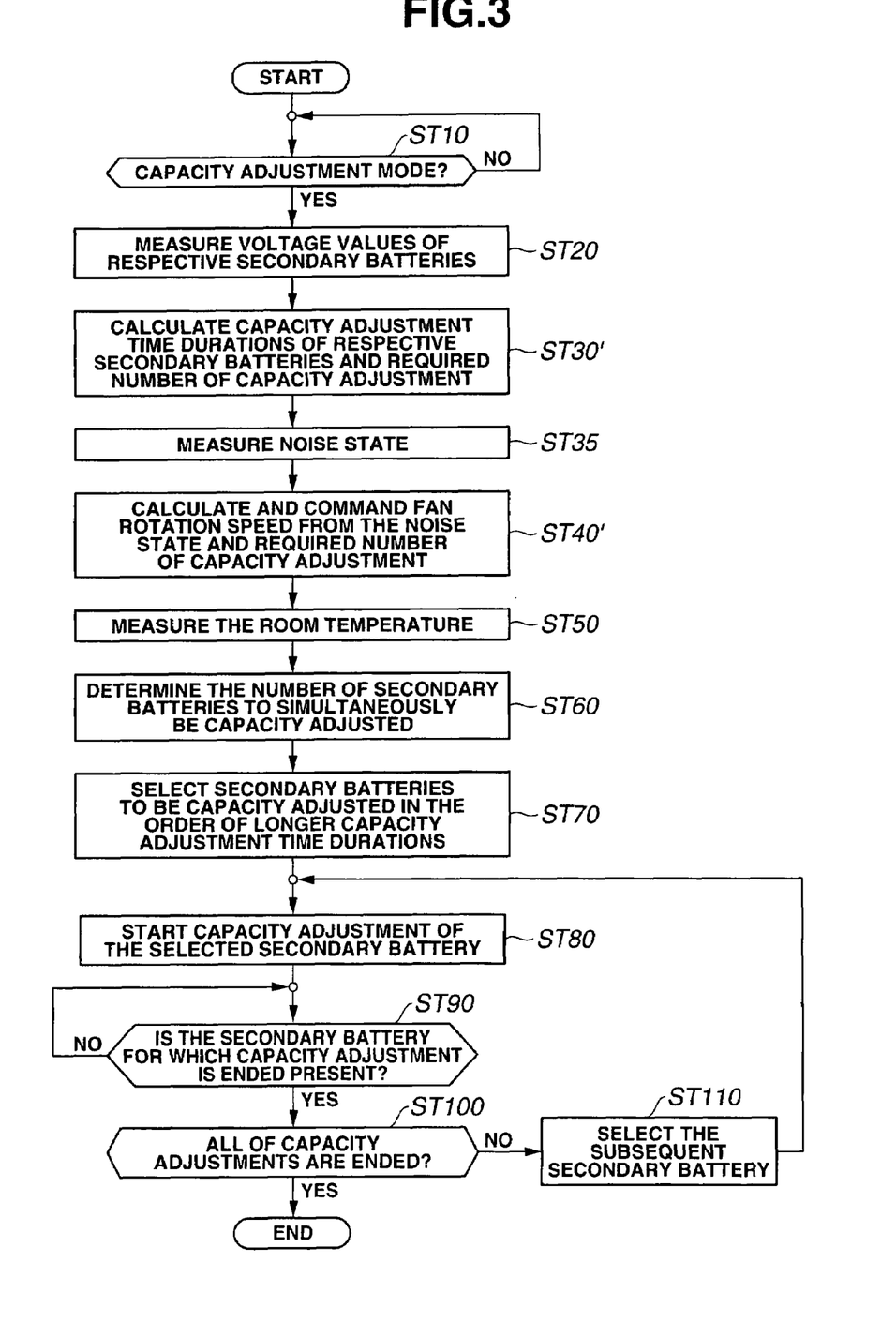
FIG. 3 is a flowchart representing another example of operation of the secondary battery capacity adjustment apparatus in the preferred embodiment.
Figure 4:
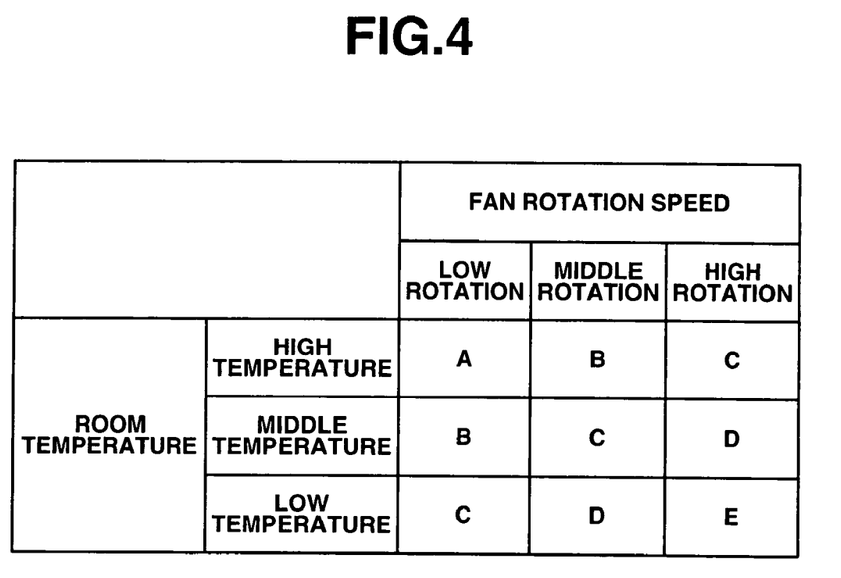
FIG. 4 is a control map representing one example of the number of secondary batteries to simultaneously be capacity adjusted with respect to a room temperature and a rotation speed of a (cooling) fan in the embodiment according to the present invention.
Figure 5:
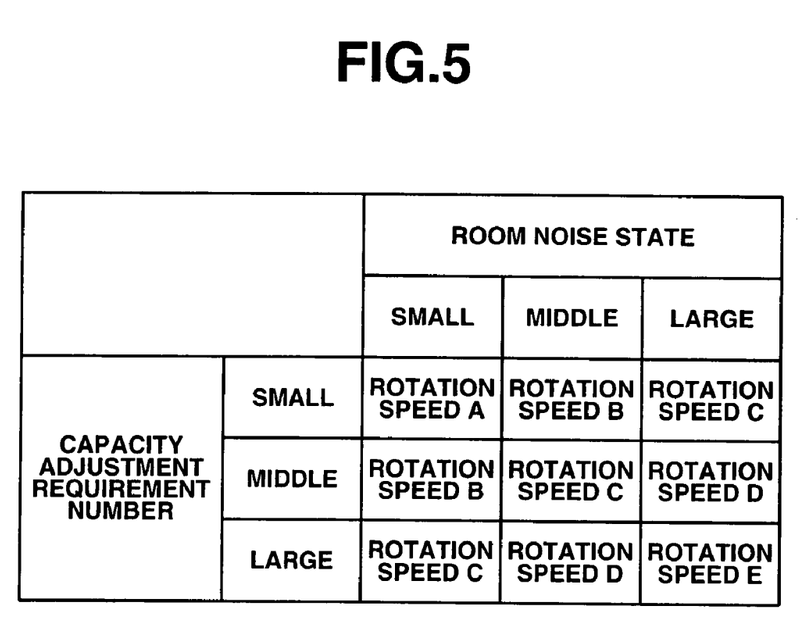
FIG. 5 is a control map representing one example of the rotation speed of the fan with respect to the number of secondary batteries required for the capacity adjustments (a capacity adjustment requirement number) and a noise state of a passenger compartment of a vehicle (room noise state) in the embodiment according to the present invention.
Figure 6:
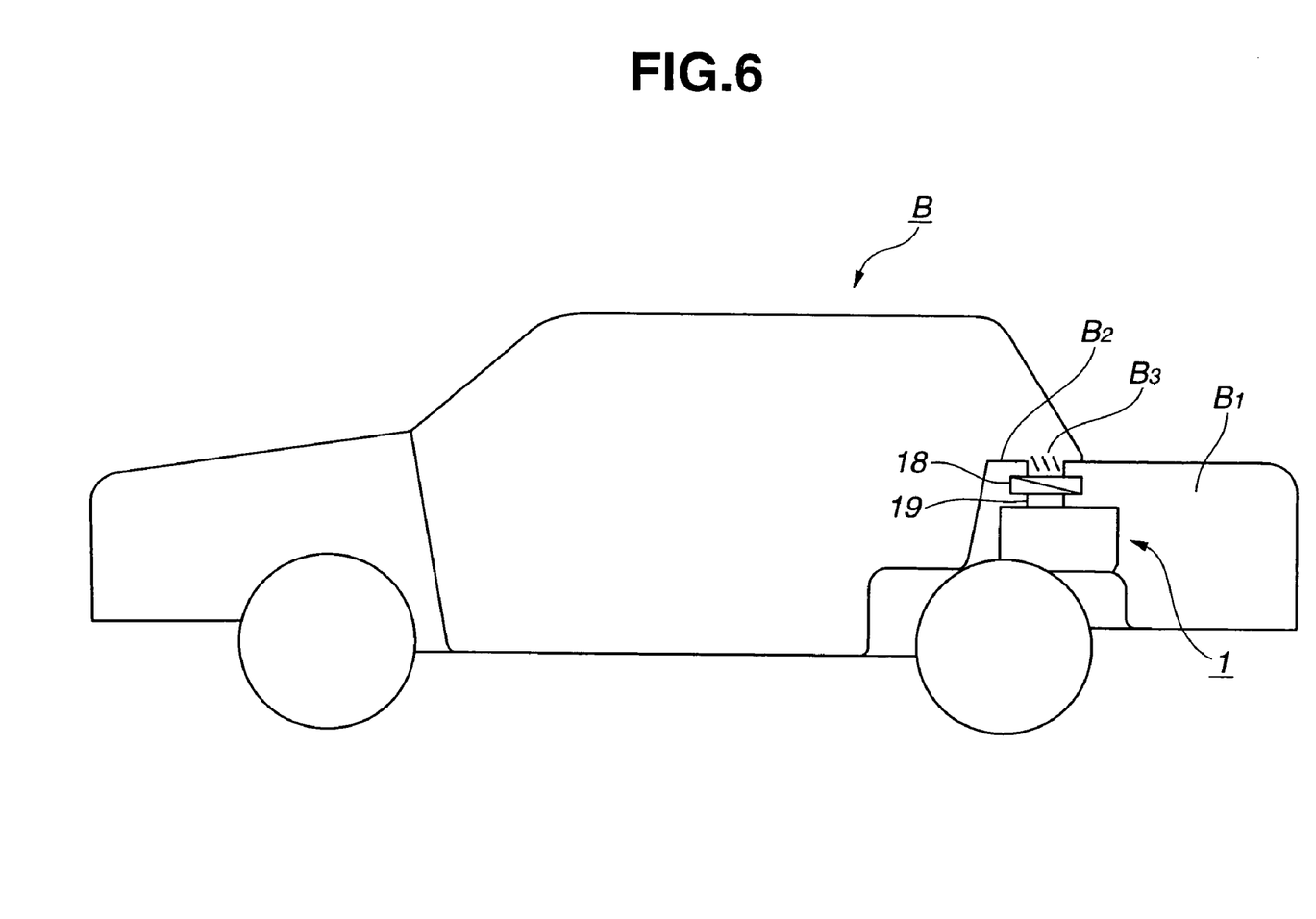
FIG. 6 is a conceptual view representing an example of mounting the assembled cell unit in the vehicle.
Figure 7:
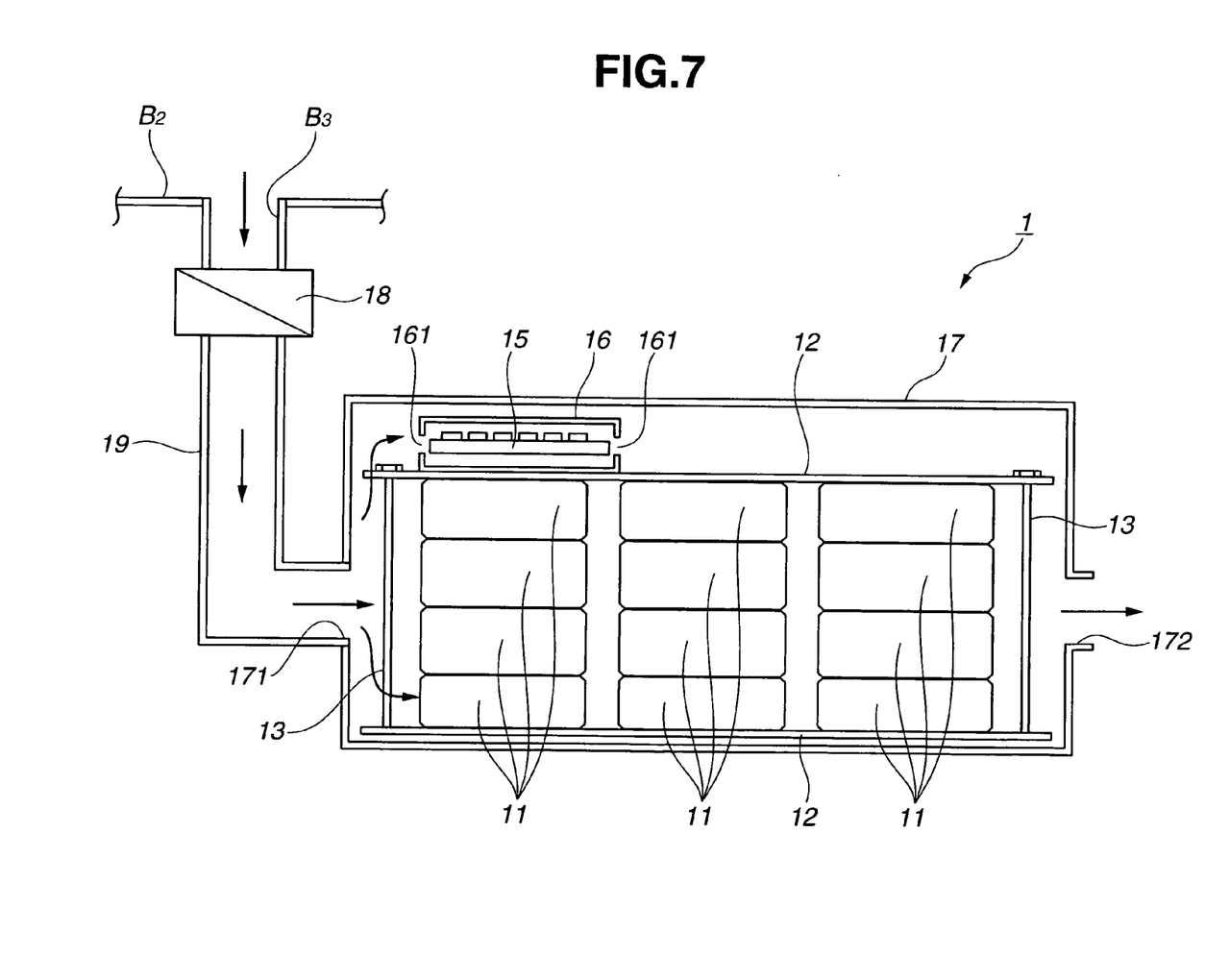
FIG. 7 is a cross sectional view representing an example of a structure of an assembled cell unit to which the secondary battery capacity adjustment apparatus and method according to the present invention are applicable.
Figure 8:
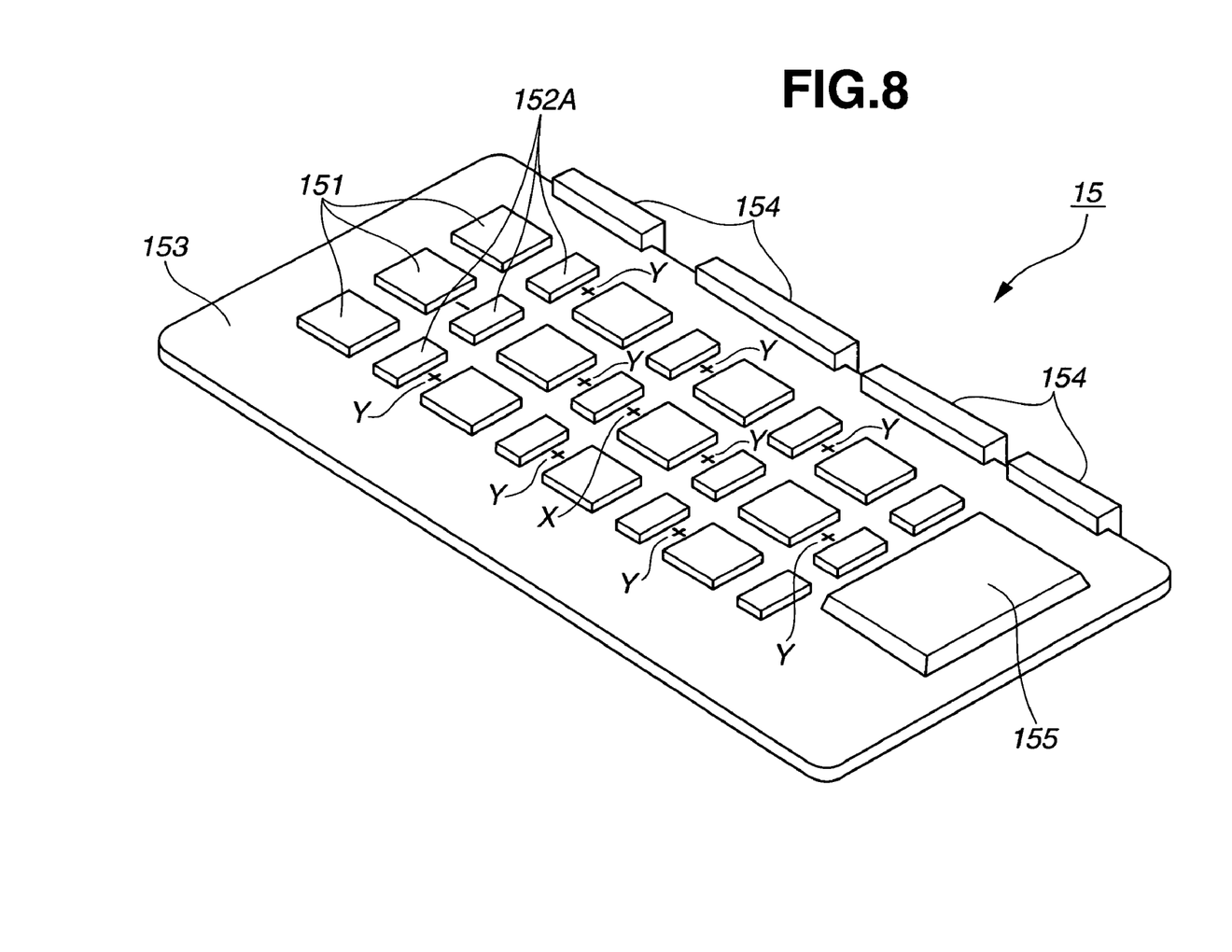
FIG. 8 is a perspective view of an example of a control board to which the secondary battery capacity adjustment apparatus and method according to the present invention are applicable.
Figure 9:
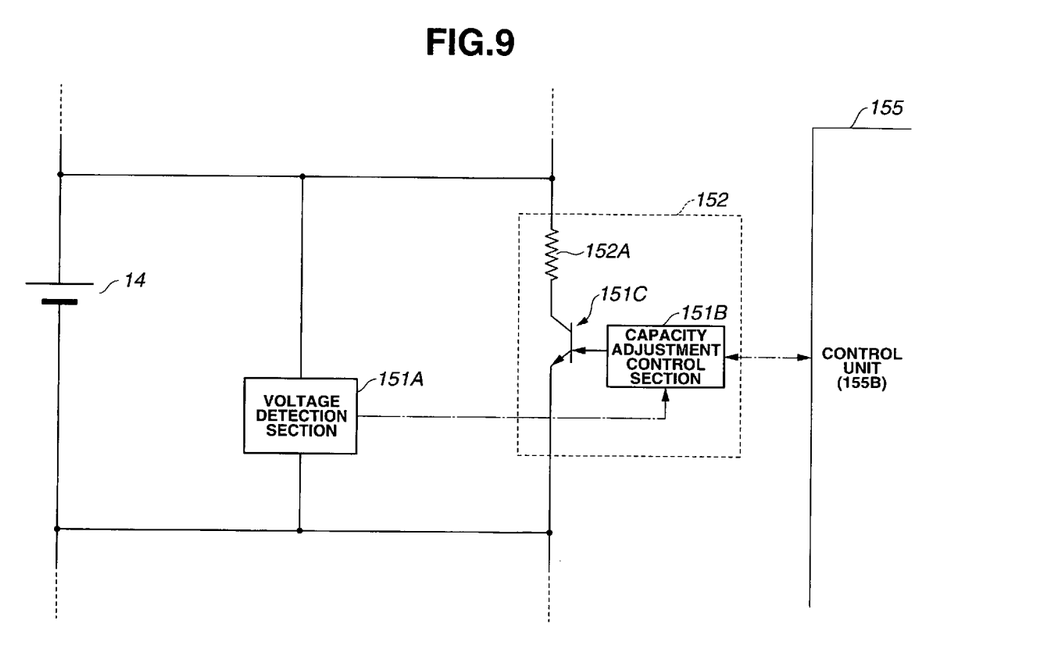
FIG. 9 is a schematic block diagram of each of capacity adjustment sections shown in FIG. 1.

FIG. 1 shows a schematic block diagram representing a preferred embodiment of a secondary battery capacity adjustment apparatus according to the present invention. FIG. 2 shows a flowchart representing an example of operation of the secondary battery capacity adjustment apparatus in the preferred embodiment shown in FIG. 1. FIG. 3 shows a flowchart representing another example of operation of the secondary battery capacity adjustment apparatus in the preferred embodiment. FIG. 4 shows a control map representing one example of the number of secondary batteries to simultaneously be capacity adjusted with respect to a room (a passenger compartment of a vehicle) temperature and a rotation speed of a (cooling) fan in the embodiment according to the present invention. FIG. 5 shows a control map representing one example of the rotation speed of the fan with respect to the number of secondary batteries required for the capacity adjustments (a capacity adjustment requirement number) and a noise state of a passenger compartment of a vehicle (room noise state) in the embodiment according to the present invention. FIG. 6 shows a conceptual view representing an example of mounting the assembled cell unit in the vehicle. FIG. 7 shows a cross sectional view representing an example of a structure of an assembled cell unit to which the secondary battery capacity adjustment apparatus and method according to the present invention are applicable. FIG. 8 shows a perspective view of an example of a control board to which the secondary battery capacity adjustment apparatus and method according to the present invention are applicable. FIG. 9 shows a schematic block diagram of each of capacity adjustment sections shown in FIG. 1.

First, a structural example of an assembled cell unit to which secondary battery capacity adjustment apparatus and method according to the present invention are applicable and an example of mounting the assembled cell unit in a vehicle according to the present invention will be explained below. Assembled cell unit 1 is mounted within a trunk room $B_1$ of vehicle B as shown in FIG. 6. In the example shown in FIG. 6, an opening $B_3$ is formed on a rear parcel panel $B_2$ of vehicle B to introduce cold air within assembled cell unit 1. Air within the passenger compartment is introduced into assembled cell unit 1 from opening $B_3$ via a duct 19. It should be noted that the mounting position of assembled cell unit 1 according to the present invention is not limited to the example shown in FIG. 5 but assembled cell unit 1 may be mounted within the passenger compartment, a bottom part of a floor within the vehicle body, an engine compartment, and so forth.

As shown in FIG. 7, assembled cell unit 1 in the example is structured in the following way. That is to say, a plurality of sheet-type thin secondary batteries are stacked and whose positive terminals are connected to negative pole terminals sequentially so that respective secondary batteries are connected in series with each other to form a cell pack 11. A plurality of cell packs 11 are stacked (in this example, four) and their positive terminals and negative terminals are connected in series with each other. Then, cell packs 11 thus stacked are aligned in plural (in the case of FIG. 7, three). Furthermore, respective positive and negative terminals located at both ends of respective cell packs 11 are connected in series with each other and upper and lower end plates 12, 12 are arranged on the upper and lower positions of laterally aligned cell packs 11 and are fixed to cell packs 11 by means of bolts 13, 13 or so forth.

In addition, a control board 15 to control respective secondary batteries 14 constituting assembled cell unit 1 is attached onto upper end plate 12 and is housed within a casing 16 (secondary battery 14 itself is shown in FIG. 1). This control board 15 is a printed circuit board on which electronic parts 151 such as integrated circuits to control respective secondary batteries 14 constituting the assembled cells (assembled cell unit 1) and resistors 152A (namely, capacity adjusting sections) to adjust respective capacities (residual capacities, namely, residual energies of the secondary batteries and, hereinafter, described merely as capacities) of corresponding secondary batteries are mounted.

FIG. 8 shows an outline of control board 15. On front and rear surfaces of a printed circuit board 153 on which wiring printed patterns are formed, integrated circuits (IC chips) 151 to control respective secondary batteries 14 and resistors 152A electrically connected in parallel to the respectively corresponding secondary batteries 14 to perform the capacity adjustments for respectively corresponding secondary batteries 14 are mounted in forms of matrices, respectively. FIG. 8 shows twelve integrated circuits 151 and twelve resistors 152A for convenience' sake. In a case where assembled cell unit 1 is, for example, constituted by 60 (sixty) sheet-type thin secondary batteries 14, 60 resistors 152A and 60 integrated circuits 151 are mounted on printed circuit board 153 to perform the capacity adjustments for the respective secondary batteries. This state is shown in FIG. 1. In addition, in FIG. 8, a reference numeral 154 denotes each of connectors in which input and output terminals to perform communications to external pieces of equipment are mounted and to connect between each thin secondary battery 14 and each resistor 152A and each integrated circuit 151 and a reference numeral 155 denotes an integrated circuit (an IC chip) to perform a control over the whole assembled cell unit 1.

Referring back to FIG. 7, a plurality of cell packs 11, 11, . . . grasped with upper and lower end plates 12, 12 are housed in an assembled cell housing 17. An air intake port 171 through which air within a vehicle passenger compartment is introduced and an exhaust port 172 through which air introduced into assembled cell casing 17 is exhausted are formed in this assembled cell casing 17. A duct 19 on which a (air intake, cooling) fan 18 is installed is coupled with intake port 171. An upper end of this duct 19 is connected to opening $B_3$ of rear parcel panel $B_2$ of vehicle B described above.

Since the secondary battery is heated during the charge and the discharge, in order to cool each secondary battery 14 housed in cell pack 11, fan 18 is operated to introduce air within the passenger compartment (cooling wind) into assembled cell casing 17. Air introduced from intake port 171 cools secondary batteries 14 while mainly passing clearances between mutually adjacent cell packs 11 and is exhausted from exhaust port 172. However, part of air functions to cool control board 15 installed on upper end plate 12. In this case, openings 161, 161 are formed on both ends of control board casing 16 in an air circulation direction of control board casing 16 in which control board 15 is housed and, thus, the air is accordingly introduced into casing 16. Then, the capacity adjustments of respective secondary batteries 14 by means of capacity adjustment resistors 152A are executed in the following way.

First, an electrical structural example of assembled cell unit 1 which is an object of secondary battery capacity adjustment apparatus and method according to the present invention will be described below with reference to FIGS. 1 and 9.

Assembled cell unit 1 in this example is constituted by a plurality of secondary batteries 14 connected in series with each other, both ends of assembled cell unit 1 being connected with a vehicle load 2 such as a starter motor, a drive motor for an electric vehicle, or so forth.

On the other hand, voltage detection sections 151A to detect voltage values of respective secondary batteries 14 are installed for respective secondary batteries 14. In addition, capacity adjustment sections 152 to adjust capacities of respective secondary batteries 14 are electrically connected across respective secondary batteries 14. Each capacity adjustment section 152 (refer to FIG. 9) includes: a resistor 152A connected in parallel to each of secondary batteries 14; a switching device 151C connected in series with this resistor 152A; and a capacity adjustment control section 151B configured to control an on-and-off of this switching device 151C on the basis of a command issued from control unit 155B and to transmit a voltage across the corresponding one of secondary batteries 14 detected through corresponding voltage detection section 151A to control unit 155B. Each of voltage detection sections 151A, switching devices 151C, and capacity adjustment control sections 151B are incorporated into an integrated circuit 151, for example, as shown in FIG. 8. It should be noted that an isolation circuit 155A shown in FIG. 1 is an isolation transmission circuit to perform a transmission of signals between capacity adjustment control section 151B of each of capacity adjustment sections 152 installed respectively on the plurality of secondary batteries 14 and control unit 155B, while electrically isolating the signals using, for example, a photo-coupler. Each of isolation circuits 155A is incorporated into integrated circuit 155 shown in FIG. 8. It should be noted that switching device 151C may be a switching device (or element) such as a transistor, a MOSFET (Metal Oxide Semiconductor-Field Effect Transistor), or an IGBT (Insulated Gate Bipolar Transistor) or may be a mechanical switch such as a relay.

In this embodiment, a room temperature sensor 3A is installed within the vehicular passenger compartment and a sensor 3B to detect a rotation speed (the number of revolutions per unit of time) of fan 18 is installed. The temperature within the passenger compartment detected by means of room temperature sensor 3A and the rotation speed detected by fan speed sensor 3B are transmitted to control unit 155B. It should be noted that, in place of room temperature sensor 3A, a temperature sensor to detect a temperature of control board 15 may be installed. Thus, a grasping of the cooling capacity during the capacity adjustment can become more accurate.

It should be noted that a reference numeral 4 shown in FIG. 1 denotes a total voltage sensor to detect a whole voltage value of assembled cell unit 1 and a reference numeral 5 denotes a current sensor to detect a current flowing through whole assembled cell unit 1.

Especially, in the embodiment, the number of secondary batteries 14 to simultaneously be capacity adjusted is determined in accordance with a temperature and an airflow quantity of a cooling wind flowing on surfaces of control board 15, in other words, in accordance with a heat radiation quantity of control board 15. That is to say, the capacity adjustments for respective secondary batteries 14 are executed in the following way. A current is caused to flow from each of secondary batteries 14 to a corresponding resistor 152A to consume an electric power of the corresponding one of secondary batteries 14 in order for the capacity of each of secondary batteries 14 to be reduced to a target capacity. Thus, the capacities of respective secondary batteries 14 are, for example, adjusted. Consequently, the capacities of the respective secondary batteries 14 are, for example, uniformed. Hence, as a result of the current flow into resistor 152A during the capacity adjustment, corresponding resistor 152A is heated. Thus, temperatures of control board 15 and electronic parts 151, 155 mounted on control board 15 are raised so that there is a possibility of producing an influence on durability of these parts. However, when the heat radiation quantity of control board 15 is large (in other words, a cooling energy for control board 15 is large), heat generations from respective resistors 152A can be absorbed even when a multiple number of secondary batteries 14 are simultaneously capacity adjusted. Hence, an efficient capacity adjustment can be carried out for each of secondary batteries without overheat of control board 15 and electronic parts 151, 155. In addition, when the heat radiation quantity of control board 15 is small (in other words, when the cooling energy for control board 15 is small), the number of secondary batteries to simultaneously be capacity adjusted is determined in accordance with the cooling capacity of control board 15. Hence, electronic parts 151, 155 can be prevented from being overheated.

FIG. 4 shows one example of settings of the number of secondary batteries to simultaneously be capacity adjusted on the basis of the cooling energy. The cooling wind flowing on control board 15 is introduced from the passenger compartment. Hence, since the temperature of the cooling wind is the room temperature and the airflow quantity of the cooling wind flowing on control board 15 is correlated to the number of revolutions per unit time (rotation speed) of fan 18, the number of secondary batteries 14 to simultaneously be capacity adjusted are set to correspond to the rotation speed of fan 18. Then, according to a combination state of the room temperature and the rotation speed of fan 18, the number of secondary batteries 14 to simultaneously be capacity adjusted are set as shown in FIG. 4. It should be noted that symbols A through E shown in FIG. 4 denote natural numbers satisfying such a relationship as A<B<C<D<E≦total number of secondary batteries 14 in assembled cell unit 1. For example, in FIG. 4, when the room temperature is high and the rotation speed of fan 18 is low, the cooling capacity of control board 15 is smallest. At this time, the number of secondary batteries 14 to simultaneously be capacity adjusted are se to a smallest number A of secondary batteries. On the other hand, when the room temperature is low and the rotation speed of fan 18 is high, the cooling capacity of control board 15 is largest. Hence, the number of secondary batteries 14 to simultaneously be capacity adjusted are a largest number E of secondary batteries 14. This control map is previously stored in a memory of control unit 155B.

In addition to the control capacity for control board 15, a capacity adjustment time duration of the corresponding one of secondary batteries 14 exerts an influence on the whole capacity adjustment time duration of secondary batteries 14 to be capacity adjusted, Hence, when secondary batteries 14 to be capacity adjusted are finally selected, each of secondary batteries 14 having a longer capacity adjustment time duration is selected on priority basis.

Next, the whole capacity adjustment method in the embodiment described above will be explained below.

As shown in FIG. 2, control unit 155B determines whether the present time is in a capacity adjustment mode at a step ST10. A timing of this capacity adjustment is not specifically limited but, for example, is during a start of vehicle B, during a vehicular stop, or so forth. Of course, it is possible to carry out the whole capacity adjustment during a vehicle traveling.

At a step ST20, control unit 155B inputs voltages of respective secondary batteries 14 detected by means of respectively corresponding voltage detection sections 151A of respective secondary batteries 14 via respective capacity adjustment control sections 151B. At the next step ST30, control unit 155B calculates the capacity adjustment time duration (namely, an interval of time during which switching device 151C is turned on) required for each of secondary batteries 14 on the basis of the inputted voltage value and a resistance value of the corresponding one of resistors 152A. That is to say, it is generally known that a correlation between the voltage value of each of secondary batteries 14 and the capacity of the corresponding one of secondary batteries 14 is present. Hence, on the basis of the voltage values, the respective capacity adjustment quantities for corresponding secondary batteries 14 are calculated and the capacity adjustment time durations in accordance with the capacity adjustment quantities of corresponding secondary batteries 14. It should be noted that methods of calculations for the respective capacity adjustment quantities of respective secondary batteries 14 calculated herein are not specifically limited. For example, the capacity adjustment values for respective secondary batteries 14 may be determined from deviations between an average value of the voltage values of all secondary batteries 14 and voltage values of respective secondary batteries 14 to be capacity adjusted or may be determined using the deviation between a maximum value of the voltage values of the plurality of secondary batteries 14 and a minimum value thereof as described in the Japanese Patent Application Publication No. 2003-284253 (published on Oct. 3, 2003) described in the BACKGROUND OF THE INVENTION.

Next, at a step ST40, control unit 155B measures the rotation speed of fan 18 by means of fan rotation speed sensor 3B and, at a step ST50, control unit 155B measures the room temperature, namely, the temperature of the cooling wind caused to flow on control board 15. Then, by referring to the control map shown in FIG. 4 at a step ST60, the number of secondary batteries 14 to simultaneously be capacity adjusted is determined.

At the next step ST70, control unit 155B selects respective secondary batteries 14 whose capacity adjustment time durations are longer than any other ones from among the number of secondary batteries 14 determined at step ST60 on priority basis.

After the number of secondary batteries 14 to simultaneously be capacity adjusted and the priority order are determined, the routine goes to a step ST80. At step ST80, the capacity adjustments of selected secondary batteries 14 are started. This operation is executed by transmitting the capacity adjustment signal (namely, the command to drivingly turn on switching device 151C) from control unit 155B shown in FIG. 1 to capacity adjustment control section 151B of capacity adjustment section 151 for the capacity adjustment time duration to turn on switching device 151C for the capacity adjustment time duration so that the current is caused to flow through resistor 152A for the capacity adjustment time duration. Thus, the capacity adjustment operation for each of selected secondary batteries 14 to be capacity adjusted is executed.

Next, at a step ST90, control unit 155B monitors whether there is one or more of selected secondary batteries 14 at which the capacity adjustments are ended. If there is one or more of selected secondary batteries 14 at which the capacity adjustments are ended (Yes), the routine goes to a step ST100. At step ST100, control unit 155B determines whether the capacity adjustments of all of selected secondary batteries 14 are ended. If there is one or more of secondary batteries 14 at which the capacity adjustments are not ended, the routine goes to a step ST110. At step ST110, control unit 155B selects one of selected secondary batteries 14 which has the subsequent priority order and, thereafter, the routine returns to step ST80 at which the capacity adjustment of the corresponding one of selected secondary batteries 14 is started. Then, this routine is repeated. If the capacity adjustments of all of selected secondary batteries 14 are ended, this processing is ended.

As described above, since the number of secondary batteries 14 to simultaneously be capacity adjusted is determined in accordance with the temperature and the airflow quantity of the cooling medium supplied to control board 15 on which each of resistors 152A which is a heat generation source, viz., in accordance with the cooling energy (the heat radiation quantity), the capacity adjustments for selected secondary batteries 14 can efficiently be executed in an extremely short time without overheat of control board 15.

As shown in FIG. 4, if the cooling energy of the cooling wind caused to flow on control board 15 is large, the number of secondary batteries 14 to simultaneously be capacity adjusted are many and the capacity adjustments of selected secondary batteries 14 are ended in a short time. However, if the room temperature is set to be low in order to enlarge the cooling energy, this often results in the room temperature against an intention of an occupant of the passenger compartment. In addition, if the rotation speed of fan 18 is set to be high, this often results in giving an unpleasant feeling to the occupant. Then, even when, while the room temperature is the nature of course (irrespective of the room temperature), with the large room noise, the rotation speed of fan 18 is more or less increased, the occupant does not give the unpleasant feeling. With this matter taken into consideration, the rotation speed of fan 18 may be controlled in accordance with the noise state within the passenger compartment.

The above-described control example is shown in FIG. 3. As shown in FIG. 3, control unit 155B determines whether the present time is in the capacity adjustment mode at step ST10. The timing of the capacity adjustment mode is not specifically limited but, for example, may be the vehicular driving state or the vehicular stop. It is of course that the capacity adjustments can be carried out even during the vehicular traveling.

At step ST20, control unit 155B inputs voltages of respective secondary batteries 14 detected by means of respectively corresponding voltage detection sections 151A of respective secondary batteries 14 via capacity adjustment control sections 151B. At the next step ST30', control unit 155B calculates capacity adjustment time durations required for respective secondary batteries 14 and the number of secondary batteries 14 required for the capacity adjustments on the basis of the voltage values of the respectively corresponding secondary batteries and resistance values of resistors 152A thereof. It should be noted that methods of calculations for the respective capacity adjustment quantities of respective secondary batteries 14 calculated herein are not specifically limited. The respective capacity adjustment quantities may be determined from the deviations from the average value of all of secondary batteries 14 or may be determined from the deviation using the maximum value and the minimum value as described in the Japanese Patent Application Publication No. 2003-284253 (published on Oct. 3, 2003) described in the BACKGROUND OF THE INVENTION.

Next, at a step ST35, control unit 155B inputs a characteristic value correlated to the room noise (noise within the passenger compartment) such as an engine speed, a traveling speed of the vehicle, or the driving torque to measure the noise state of the vehicular passenger compartment. It should be noted that the noise state may be detected by installing a sensor such as a microphone to measure a sound volume within the passenger compartment.

At a step ST40', control unit 155B determines the rotation speed of fan 18 from the number of secondary batteries 14 required for the capacity adjustments and the noise state of the passenger compartment. In this determination, for example, the control map as shown in FIG. 5 is used. The control map shown in FIG. 5 is such that the rotation speed of fan 18 is predetermined in accordance with a combination between the number of secondary batteries 14 required for the capacity adjustments (capacity adjustment requirement number) and the noise state within the passenger compartment. In FIG. 5, symbols representing rotation speeds A through E denote natural numbers satisfying A<B<C<D<E≦maximum number of rotations. For example, in FIG. 5, when the number of secondary batteries 14 required for the capacity adjustments is small and the nose within the passenger compartment is small, the heat generation quantity may accordingly be small and the unpleasant feeling is given to the occupant if the rotation speed of fan 18 is increased. In this case, the rotation speed of fan 18 is set to a lowest rotation speed A. On the other hand, when the number of secondary batteries 14 required for the capacity adjustments are many and the room noise is large, the heat generation quantity is large and the noise generated due to the high ration speed of fan 18 is cancelled by the room noise. In this case, the rotation speed of fan 18 is set to a highest rotation speed E. This control map is pre-stored in a memory of control unit 155B.

At step ST40', the rotation speed of fan 18 is transmitted to a control unit of fan 18. At a step ST50, control unit 155B measures the room temperature through room temperature sensor 3A, viz., measures the temperature of the cooling wind caused to flow on control board 15. Then, at step ST60, control unit 155B determines the number of secondary batteries 14 which can simultaneously be capacity adjusted by referring to the control map shown in FIG. 4.

At the next step ST70, control unit 155B selects one or more of secondary batteries 14 whose capacity adjustment time durations are longer than the other ones from among the number of secondary batteries 14 determined at step ST60 on priority basis.

After the number of secondary batteries 14 to simultaneously be capacity adjusted and the priority order are determined, the routine goes to step ST80. At step ST80, the capacity adjustments of selected secondary batteries 14 are started. This operation is executed by transmitting the capacity adjustment signal (namely, the command to drivingly turn on switching device 151C) from control unit 155B to capacity adjustment control section 151B of capacity adjustment section 152 for the capacity adjustment time duration to turn on switching device 151C for the capacity adjustment time duration so that the current is caused to flow through resistor 151A for the capacity adjustment time duration. Thus, the capacity adjustment operation for each of selected secondary batteries 14 is executed.

Next, at step ST90, control unit 155B monitors whether there is one or more of selected secondary batteries 14 at which the capacity adjustments are ended. If there is one or more of the selected secondary batteries 14 at which the capacity adjustments are not carried out, the routine goes to a step ST110. At step ST110, control unit 155B selects one of selected secondary batteries 14 which has the subsequent priority order and, thereafter, the routine returns to step ST80 at which the capacity adjustment of the corresponding one of selected secondary batteries 14 is started. Then, this routine is repeated. If the capacity adjustments of all of selected secondary batteries 14 are ended, this processing is ended.

As described above, in the example shown in FIG. 3, the rotation speed of fan 18 is controlled in accordance with the noise state within the passenger compartment and the number of secondary batteries 14 to simultaneously be capacity adjusted is determined in accordance with the temperature and the airflow quantity of the cooling medium supplied to control board 15 on which resistor 152A for each of secondary batteries 14 is mounted which is the heat generation source, namely, in accordance with the cooling energy (heat radiation quantity). Hence, the capacity adjustment of the whole assembled cell unit can efficiently be executed in an extremely short time without overheat of control board 15.

It should be noted that the above-described embodiment are described in order to facilitate a better understanding of the present invention and do not limit the scope of the present invention. Hence, each essential element disclosed in the above-described embodiments includes all design modifications and equivalents belonging to the scope of the present invention.

This application is based on a prior Japanese Patent Application No. 2006-112021. The entire contents of a Japanese Patent Application No. 2006-112021 with a filing date of Apr. 14, 2006 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A secondary battery capacity adjustment apparatus for an assembled cell unit, the assembled cell unit including: a plurality of secondary batteries; and a control board on which a capacity adjusting section is mounted, the capacity adjusting section being installed to correspond to each of the secondary batteries and configured to consume an electric power of a corresponding one of the secondary batteries to adjust a residual capacity of the corresponding one of the secondary batteries, the secondary battery capacity adjustment apparatus comprising:
   a determining section configured to determine the number of the secondary batteries to be residual capacity adjusted in accordance with a heat radiation quantity of the control board; and
   a secondary battery capacity adjusting section configured to have the electric power of each of the secondary batteries to be residual capacity adjusted consumed by the corresponding capacity adjusting section, for the determined number of secondary batteries to be residual capacity adjusted, to adjust a residual capacity of each of the secondary batteries.

2. The secondary battery capacity adjustment apparatus as claimed in claim 1, wherein the heat radiation quantity is detected in accordance with a temperature and a flow quantity of a cooling medium caused to flow on surfaces of the control board.

3. The secondary battery capacity adjustment apparatus as claimed in claim 1, wherein the secondary battery capacity adjustment apparatus further comprises: a cooling medium supply section configured to supply a cooling medium onto surfaces of the control board; a noise state detecting section configured to detect a noise state within a vehicular passenger compartment in which the secondary batteries and the control board are mounted; and an airflow quantity controlling section configured to control the cooling medium supply section to control an airflow quantity of the cooling medium caused to flow on the surfaces of the control board in accordance with the noise state within the vehicular passenger compartment.

4. The secondary battery capacity adjustment apparatus as claimed in claim 1, wherein the capacity adjusting sections for the secondary batteries are mounted on a main surface of the control board approximately in a matrix form.

5. The secondary battery capacity adjustment apparatus as claimed in claim 1, wherein each of the capacity adjusting sections comprises a resistor electrically connected in parallel to the corresponding one of the secondary batteries and configured to consume the electric power with an electric current from the corresponding one of the secondary batteries supplied.

6. A secondary battery capacity adjustment method for an assembled cell unit, the assembled cell unit including: a plurality of secondary batteries; and a control board on which a capacity adjusting section is mounted, the capacity adjusting section being installed to correspond to each of the secondary batteries and configured to consume an electric power of a corresponding one of the secondary batteries to adjust a residual capacity of the corresponding one of the secondary batteries, the secondary battery capacity adjustment method comprising:
   determining the number of the secondary batteries to be residual capacity adjusted in accordance with a heat radiation quantity of the control board; and
   having the electric power of each of the secondary batteries to be residual capacity adjusted consumed by the corresponding capacity adjusting section, for the determined number of secondary batteries to be residual capacity adjusted, to adjust a residual capacity of each of the secondary batteries.

7. The secondary battery capacity adjustment method as claimed in claim 6, wherein the heat radiation quantity is detected in accordance with a temperature and a flowing quantity of a cooling medium caused to flow on surfaces of the control board.

8. The secondary battery capacity adjustment method as claimed in claim 6, wherein the secondary battery adjustment method further comprises: supplying a cooling medium onto surfaces of the control board; and controlling an airflow quantity of the cooling medium caused to flow on surfaces of the control board in accordance with a noise state within a vehicular passenger compartment.

* * * * *